US005283280A

United States Patent [19]

Whyte et al.

[11] Patent Number: 5,283,280

[45] Date of Patent: Feb. 1, 1994

[54] COMPOSITION AND METHOD FOR COATING AN OBJECT OF INTEREST

[75] Inventors: Donald E. Whyte, Racine; Dennis M. Wagen, Waukesha; Robert A. Balow, Racine, all of Wis.

[73] Assignee: Tech One, Inc., Genesee Depot, Wis.

[21] Appl. No.: 972,165

[22] Filed: Nov. 5, 1992

[51] Int. Cl.[5] ............ C08L 75/00

[52] U.S. Cl. ............ 524/559; 524/560; 427/374.1

[58] Field of Search ............ 524/559, 560, 561, 562, 524/563, 568, 582, 585; 427/374.1, 385.5, 388.1, 388.2, 388.4

[56] References Cited

U.S. PATENT DOCUMENTS

| | | | |
|---|---|---|---|
| 3,503,918 | 3/1970 | Le Sota et al. | 260/29.7 |
| 4,087,290 | 5/1978 | Kopietz et al. | 148/18 |
| 4,113,682 | 9/1978 | Nagata et al. | 260/29 |
| 4,243,704 | 1/1981 | Hall et al. | 427/327 |
| 4,251,292 | 2/1981 | Foreman et al. | 148/18 |
| 4,404,044 | 9/1983 | Warchol | 148/18 |
| 4,486,246 | 12/1984 | Warchol | 148/18 |
| 4,528,044 | 7/1985 | Warchol | 148/18 |
| 4,650,527 | 3/1987 | Ishii et al. | 148/6.16 |
| 4,690,837 | 9/1987 | Doroszkowski | 427/314 |
| 4,738,731 | 4/1988 | Foreman et al. | 148/18 |
| 5,061,523 | 10/1991 | Shachat | 427/377 |
| 5,112,413 | 5/1992 | Carey et al. | 148/251 |

FOREIGN PATENT DOCUMENTS

| | | | |
|---|---|---|---|
| 53-14746 | 2/1978 | Japan . | |
| 2099858 | 12/1982 | United Kingdom | C21D 1/60 |

*Primary Examiner*—Maurice J. Welsh
*Attorney, Agent, or Firm*—Godfrey & Kahn

[57] ABSTRACT

Compositions and a method are described which possess utility for the application of a corrosion-resistant surface to an object of interest. The composition of the subject invention includes a polymeric solution, emulsion or dispersion, and a compatible dispersion which are combined with water to form a bath. The objects of interest to be coated are thereafter quenched in the bath.

1 Claim, No Drawings

COMPOSITION AND METHOD FOR COATING AN OBJECT OF INTEREST

BACKGROUND OF THE INVENTION

1. Field of the Invention

The present invention relates to a composition and method for coating an object of interest, and more particularly to a composition which may be applied to metal or other heat resistant substrates; the composition when properly applied providing a durable and attractive finish, while simultaneously imparting improved corrosion resistance to the object of interest, and further having no deleterious environmental impact.

2. Description of the Prior Art

The prior art is replete with numerous compositions and methods for coating objects of interest such as steel, or aluminum assemblies, and wherein the coating composition is applied to the object of interest to substantially impede corrosion which acts at the surface of the object, following its exposure to various corrosive substances which are present in the ambient environment—such as atmospheric gases, water, and the like. For example, and in the production of steel, and in particular steel which has a predetermined hardness, the surface of the steel may often become so reduced by the processing steps that the surface of the steel will corrode rapidly (often in minutes) when exposed to ambient water vapor. To address this particular problem, manufacturers of steel often apply a coating of soluble oil to the steel being processed thereby providing a surface which will impede, at least for some period of time, the onset of corrosion.

Additionally, among the various metallic coatings applied to iron and steel which provide protection against corrosion, zinc has played a very important role. In this regard, the process of applying a zinc coating is considered to be the technique of galvanizing. Galvanizing is used extensively for such products as bar, tube, strip wire, and sheet stock, and for all manner of articles and utensils such as buckets, watering cans, garbage cans, etc.

The most commonly applied process of galvanizing is "hot dip" galvanizing whereby the zinc coating is obtained by the immersion of the object of interest in a bath of molten zinc. In this process, the zinc combines with, for example, iron so that iron and zinc alloy crystals are formed, which provide a firmly adhered coating.

To employ a successful hot dip galvanizing method, the object to be exposed, such as steel must be substantially free of all oil, grease, dirt, scale, and corrosion products. The preparatory treatment may include degreasing with a suitable solvent, pickling with acid, rinsing the object, treating it with a flux, and drying. The purpose behind the step of pickling is to remove any oxide films which are present at the surface by the action of hydrochloric or sulfuric acid. The flux, which is usually a mixture of zinc chloride and ammonium chloride, serves to remove any remaining traces of impurities and increases the wetability of the steel surface.

In "wet galvanizing", the flux is deposited in molten form in the zinc bath, and the metal to be galvanized is introduced into the bath through the layer of flux. In "dry galvanizing", the metal components are first dipped in a solution of the flux and are then dried so that they become precoated with a thin film of flux which melts in the zinc bath.

Another commonly employed method for applying protective coatings to metal surfaces includes metal spraying. In this particular process, molten metal is applied on the surface of the object to be coated. Normally the coating metal, which is in the form of a wire, is fed into a spray gun or similar device whereby it is melted by the combustion of a fuel gas such as, for example, a mixture of oxygen and acetylene. Normally, the spray gun, or other spray assembly, includes two rollers which are powered by an air turbine, and which feeds the wire through the central portion of a special nozzle. In this nozzle the gas is ignited, and the wire is melted and thereby emerges from the nozzle in a particulate form. The molten metal is thereafter atomized by compressed air and is projected at high velocity against the surface to be coated. Coatings of lead, aluminum, silver or stainless steel are often used for providing protection against corrosion for special apparatuses employed in the chemical and food stuff industries. Steel or hard-alloy coatings are also used as wear surfaces on various objects. For instance, light alloy pistons can be coated with a sprayed steel coating. In the electronics and telecommunications industries, metallic coatings are applied to nonmetallic materials to make them electrically conductive.

Another common method employed for coating surfaces to inhibit corrosion includes the process of electroplating. Electroplating is the process of producing a metallic coating on a surface by electro-deposition, that is, by the action of an electric current. Such coatings may perform a mainly protective function, that is, to prevent corrosion as for example plating with zinc, or electro-galvanizing with tin; or further, a decorative function such as applying gold or silver plating. The principle surrounding electroplating is that the coating metal is deposited from an electrolyte, that is, from an aqueous acid or alkaline solution onto the object.

To obtain an acceptable and firmly adhering electroplated coating, it is necessary to subject the objects to be coated to a thorough cleaning. This may be achieved by a mechanical treatment, that is, sandblasting, grinding, wire brushing, scraping or the like, or by physical methods such as degreasing with organic solvents or by chemical methods such as pickling with acid or degreasing by the action of alkalines (this is often termed "saponification"), or by electrocleaning which is a method of cleaning by electrolytic action. In this regard, electrolytic action is often described as the scrubbing action which is expressed by the evolution of gas at the surface of the metal. Additionally, wetting agents and emulsifiers may be added and are useful to the process.

While the several processes noted above operate with some degree of success, they have a number of shortcomings which have detracted from their usefulness. For example, many of the processes noted above include the use of compositions which are not environmentally friendly, that is, they include compositions having heavy metals or VOC's (volatile organic compounds) which have been identified as being harmful to the environment or which are otherwise prohibited or regulated by various state and federal laws such as California Proposition 65. Additionally, common methods such as the zinc electroplating method, discussed earlier, and which will normally produce an object which has a level of corrosion resistance equal to approximately 250 hours when exposed to a salt spray, are often further enhanced by other compositions which are applied thereto and which extend their corrosion resistance. For example, a second coating termed an "E coating" (electrolytic coating) is often applied to zinc electroplated objects in order to enhance their corrosion resistance. Normally, it is expected that an E coating may add approximately another 100 hours of corrosion resistance to these objects. Additionally, a zinc-nickel coating may also be applied to an object by the same method, and this process may increase the corrosion resistance of this same part to a period of approximately 900 to 1,000 hours when exposed to the same corrosive conditions.

Another shortcoming attendant to the prior art processes is that each of these processes require that the object be thoroughly cleaned prior to the plating process, thereby ensuring that a uniform surface be applied to same. The extra steps required to clean the object, for example, are often time consuming, costly, and further include the use of various solvents and other materials which are, as discussed above, prohibited or regulated by public law, or alternatively, are difficult to dispose of in an environmentally safe manner.

In addition to the foregoing, and while these various methods, as earlier discussed, have produced various laudable benefits, they have a further shortcoming inasmuch as they cannot be readily retrofitted or introduced into a manufacturing process without substantially interfering or delaying the process, and further cannot normally be introduced without substantial expense.

Therefore, it has long been known that it would be desirable to have a composition and method for coating an object of interest and which has particular utility when applied to objects of interest which corrode when exposed to water vapor and other corrosive substances in the ambient environment, and which further, can be readily introduced into the manufacturing process, and which produces a corrosion-resistant surface which is durable, and attractive, and which substantially avoids the shortcomings attendant with the prior art practices.

SUMMARY OF THE INVENTION

Therefore, it is an object of the present invention to provide a composition and method for coating an object of interest.

Another object is to provide such a composition and method which is particularly well-suited for being introduced into a manufacturing process and which further does not substantially impede or otherwise inhibit the prompt processing of an object of interest in an industrial process.

Another object is to provide such a composition and method which is particularly well-suited for coating objects of interest having compositions of steel, iron, and the like, the coating providing a durable and attractive finish while simultaneously inhibiting the development of corrosion for a period of time substantially equal to the corrosion resistant coatings which have been applied by the prior art methods employed heretofore.

Another object of the present invention is to provide a composition and method for coating an object of interest wherein the composition includes about 5 parts to about 90 parts, by volume, of a polymeric solution, emulsion or dispersion; about 0.5 parts to about 9 parts, by volume, of a compatible dispersion; and about 10 parts to about 95 parts, by volume, of water; and wherein the admixture is elevated to a temperature of about 80° F. to about 160° F., and wherein the object of interest is elevated to a temperature of about 220° F. to about 1700° F.; the object of interest following heating being quenched in the admixture thereby causing the admixture to become substantially uniformly coated on the object of interest.

Another object is to provide a composition and method for coating an object of interest, and wherein the polymeric solution, emulsion or dispersion is selected from the group of polymeric solutions, emulsions or dispersions which include water reducible alkyd resins, acrylic polymers, acrylic resins, acrylic emulsions, thermoplastic urethanes, acrylic colloidal solutions, multi-functional carbodiimides, water-dispersable polyurethane lacquers, melamine-formaldehyde resins, styrene-acrylic polymers, microcrystalline, or polyethylene, or polypropylene, or polyethylene/paraffin wax emulsions, polyvinylidene chloride copolymer emulsions and ethylene acrylic copolymer emulsions.

Another object of the present invention is to provide a composition and method for coating an object of interest and wherein the formulation has a concentration of solids of about 2% to about 40%, by volume.

Another object of the present invention is to provide a composition and method for coating an object of interest and wherein the admixture is depleted from a bath of the composition at approximately the same ratios as the admixture formulation.

Another object of the present invention is to provide a composition and method for coating an object of interest which is characterized by ease and simplicity in its utilization and which further can be employed at a substantially nominal expense in relative comparison to the prior art practices.

Further objects and advantages are to provide improved elements and arrangements thereof in a method and composition for coating an object of interest for the purposes intended and which is dependable, economical, durable, and fully effective in accomplishing its intended purposes.

These and other objects and advantages are achieved in a method and composition for coating an object of interest which includes about 5 parts to about 90 parts, by volume, of a polymeric solution, emulsion or dispersion, and wherein the polymeric solution, emulsion or dispersion contains about 20% to about 90%, by weight, of solids; about 0.5 parts to about 9 parts, by volume, of a compatible dispersion, and wherein the dispersion contains about 5% to about 70%, by weight, of solids; and about 10 parts to about 95 parts, by volume, of water thereby forming a bath having a solids concentration of about 2% to about 40%, by volume, and wherein the method includes elevating the object of interest to a temperature of about 220° F. to about 1,700° F., and wherein the object of interest is quenched in the bath for a predetermined period of time thereby causing the composition to be deposited on the surface of the object of interest.

DESCRIPTION OF THE PREFERRED EMBODIMENT

The preferred composition for coating an object of interest contains about 5 parts to about 90 parts, by volume, of a polymeric solution, emulsion or dispersion and wherein the polymeric solution, emulsion or dispersion contains about 20% to about 90%, by weight, of solids; about 0.5 parts to about 9 parts, by volume, of a compatible dispersion, and wherein the dispersion contains about 5% to about 70%, by weight, of solids; and about 10 parts to about 95 parts, by volume, of water, thereby forming a bath having a solids concentration of about 2% to about 40%, by volume. As will be recognized, the concentration of solids makes the aforementioned bath quite dilute, relatively speaking.

The polymeric solution, emulsion or dispersion of the present composition may be selected from the group of polymeric solutions, emulsions or dispersions which include water-reducible alkyd resins, acrylic polymers, acrylic colloidal dispersions, acrylic resins, acrylic emulsions, acrylic colloidal solutions, thermoplastic urethanes, multi-functional carbodiimides, water-dispersable polyurethane lacquers, melamine-formaldehyde resins, styrene-acrylic polymers, microcrystalline or polyethylene or polypropylene, or polyethylene/-paraffinic wax emulsions, polyvinylidene chloride copolymer emulsions, and ethylene-acrylic copolymer emulsions. It will also be recognized that mixtures of the above polymeric solutions, emulsions or dispersions may also be used in the manufacture of the compositions of the present invention.

As should be understood, the polymeric solutions, emulsions or dispersions, noted above normally have concentrations of solids of about 20% to about 90%, by volume. When admixed in the formulation, noted above, the composition of the subject invention has a composition of about 2% to about 40%, by volume. Suitable polymeric solutions, emulsions or dispersions which may be utilized in connection with the teachings of the present invention are sold under the trademark, "Joncryl 646" and which is an acrylic colloidal emulsion manufactured and marketed by the S.C. Johnson Wax Co. of Racine, Wis. Other suitable polymeric solutions or emulsions which are commercially available through the S.C. Johnson Wax Company includes Joncryl 61; Joncryl 1535; Joncryl 91 Joncryl 77; Joncryl 142; Joncryl 54; Jonwax 39; Jonwax 120; Jonwax 221; and Joncryl 617, respectively. These polymeric solutions, emulsions or dispersions include styrene-acrylic polymers, acrylic colloidal dispersions, acrylic resin solutions, acrylic polymer solutions, acrylic colloidal solutions, and microcrystalline or polyethylene, or polypropylene, or polyethylene/paraffin wax emulsions, respectively. Other commercially available substances which may be utilized as the polymeric solution include the product marketed under the trade designation "Cymel 303" Resin, and which is supplied by the American Cyanamid Company. Cymel 303 is a melamine-formaldehyde resin; Serfene 2060 which is a polyvinylidene chloride copolymer emulsion, which is marketed by Morton International; and ACqua 220, which is an aqueous dispersion of the zinc salt of an ethylene-acrylic copolymer, and which is marketed by the Allied Signal, Inc. Additionally, a suitable water reducible modified alkyd resin solution may be procured from the Cargil Company of Carpentersville, Illinois, as Product No. 7478. Moreover, a thermoplastic aqueous urethane solution marketed under the trade designation Spensol L-52 by Reichhold Chemicals, Inc. has been found useful in the practice of the present invention.

As should be understood, the inventors of the present invention have discovered surprising results when the composition of the present invention is employed in a method which includes elevating a bath of the composition to a temperature of approximately 80° F. to approximately 160° F., and wherein the object of interest such as a heat resistant part which is manufactured from metal such as steel, iron, aluminum, or the like, is elevated to a temperature of about 220° F. to about 1700° F. and subsequently quenched in the admixture with the result that the admixture becomes substantially uniformly coated on the object of interest. As will be appreciated, other substrates such as fiberglass, wood, and all manner of other heat resistant materials could be conceivably coated using the present method. This method is particularly surprising in view of the fact that the various polymers utilized in the solution, noted earlier, are degraded or destroyed at temperatures which are many times lower than the temperature of the object of interest which is being quenched in the bath. It is, therefore, surprising that the composition would coat the object (and in particular coat the object so uniformly) in view of high temperatures and the dilute nature of the bath. It is even further surprising that the compositions provide the level of corrosion resistance discovered by the inventors.

While not being bound by any particular scientific theory, the inventors believe that the corrosion resistance imparted by the present composition may be partially the result of the water portion of the composition "flashing off" or immediately evaporating, or departing from the surface of the particular object of interest when it is removed from the dilute bath. The inventors believe that this "flashing off" of the water results in a coating having a minimal amount of entrapped water, and air. It is believed, therefore, that without the presence of air, or water, in the coating, that this condition substantially impedes the development of corrosion. Additionally, objects which have been coated in accordance with the method noted above, have a tight, substantially even coating which is very attractive in many instances, and which is durable and dry upon departing from the bath. In addition to the foregoing, the present composition and method provides a means by which various compatible dispersions may be added to the present composition therefore providing a convenient vehicle by which colored coatings may be applied to the objects of interest. This has not been possible, heretofore.

As earlier discussed, the composition of the present invention includes about 0.5 parts to about 9 parts, by volume, of a compatible dispersion. The compatible dispersion may be selected from the group of compatible dispersions which include carbon black; semi-colloidal graphite in water; aluminum paste; Teflon®; and acrylic emulsions, to name but a few. As noted above, these emulsions may include color pigments which provide a convenient means for coloring the surface of the object of interest. In addition to the foregoing, finely milled solids such as stainless steel, or Teflon® can be added to the bath and provides a surface which has increased durability, or decreased friction. As should be understood, and when milled solids such as stainless steel powder are introduced to the bath, these same materials will not dissolve into solution, but rather are suspended substantially homogeneously therein by continuous agitation. Suitable materials may be commercially obtained from companies such as CDI Dispersions, Inc., under the trade designation BS13544, and which is a tinting black aqueous pigment; The Asbury Graphite Mills under the trade designation 81120, and which is a semi-colloidal graphite in water; and MD-Both Industries under the trade designation 1981, and which is an aluminum paste. Finely milled, metallic powders may be secured from a number of commercial sources.

The composition of the subject invention, as earlier discussed, is quite dilute, relatively speaking, that is, and as noted in the formulation, above, includes about 10 parts to about 95 parts water. The applicants have further discovered surprising results when employing the present formulation inasmuch as the admixture appears to become depleted or is removed from the bath, at approximately the same ratios as the formulation. Therefore, the act of replacing or replenishing the bath is done quite easily, and does not require any quantitative analysis prior to replenishing. Additionally, and while the prior art teaches that preliminary to implementing the coating process utilizing the prior art methods discussed earlier, that the parts to be plated, or coated, must be substantially clean or devoid of any contamination such as grease, oil, and other particulate matter, the inventors, in contrast, have discovered that such is not the case with the present method. In particular, the inventors have discovered that a substantially uniform and durable coating may be placed upon the object of interest notwithstanding that the surface is contaminated by oil, other particulate matter, and compounds, such as oxides. Of course, these conditions would substantially impair or degrade the coatings applied by the methods of the prior art.

The composition of the present invention may be formulated using any techniques known in the art. A representative example of this procedure includes introducing or charging the selected polymeric dispersion(s), emulsion(s) and/or solution(s), and compatible dispersion(s) into a suitable enclosure or container, and then adding a sufficient volume of water thereby forming a bath having the volumetric ratios noted earlier. Following agitation to form a homogeneous composition, the bath is elevated to a temperature of approximately 80° to 160° F. At this point, the objects of interest, which have been elevated to a temperature of about 220° F. to approximately 1,700° F. are quenched in the bath for a predetermined period of time based upon the nature of the part involved. In most instances, this exposure may be anywhere from as short as fifteen (15) seconds to as long a one-hundred and twenty (120) seconds. After exposure for this predetermined period of time, the object is moved, such as by a conveyor or the like, out of the bath. Following removal from the bath, the water, remaining in the composition which is coated onto the particular object of interest appears to flash off, or immediately evaporate, thereby providing a substantially uniform attractive and corrosion-resistant coating.

As discussed earlier, optional additives such as powdered metal and various color pigments and/or dyes may be added to the composition in order to modify particular physical properties.

The invention is further illustrated by way of the several examples which are set forth below. All examples were combined in the fashion as described, above.

EXAMPLE 1

A composition in accordance with the teachings of the present invention was made by the general procedure noted above. This fluid composition had the following constituent elements:

Joncryl 142—acrylic polymer emulsion—40%

CDI BS13544—tinting black aqueous dispersion—1%

Water—59%

In this particular example, the Joncryl 142 had a solids concentration of approximately 39.5%. When diluted in the present composition, its solids concentration was approximately 15.8%. In the case of the BS13544, its total solids concentration is approximately 45%. When diluted in the fluid composition, noted above, its total solids concentration is approximately 0.45%. Therefore the total solids concentration of the present bath, by volume, is approximately 16.25%. The resulting fluid composition was heated to a temperature of 120° F., thereafter, and metal parts were quenched in this composition having been previously raised to a temperature of approximately 350° F. Following quenching in the bath for approximately 60 seconds, the objects were removed and thereafter inspected and were found to be totally dry. Further examination of the surface revealed a substantially uniform and complete coverage of the entire surface by the composition of the present invention.

EXAMPLE 2

A composition in accordance with the teachings of the present invention was made by the general procedure described above. This composition had the following constituent elements:

Joncryl 91—acrylic colloidal solution—20%

Asbury 81120—semi-colloidal graphite in water—4%

Water—76%

In this particular example, the total solids concentration for the Joncryl 91 was approximately 25.5%. When diluted in the manner noted above, the total solids concentration of this component represented approximately 5.10% of the total volume of the bath. Additionally, the total solids concentration of the Asbury 81120 was approximately 22%. When diluted in the bath, the total solids concentration was approximately 0.88%. Therefore, the total solids concentration present in the fluid composition of the bath of the present invention was approximately 5.98%. The resulting bath was brought to a temperature of 120° F., thereafter, and metal parts, having been previously elevated to a temperature of 950° F. were quenched in the bath for a period of 60 seconds. The quenched parts were subsequently removed and inspected and similar results were obtained as set forth in example 1, above.

EXAMPLE 3

A fluid composition in accordance with the teachings of the present invention was made by the general procedure described above. This composition had the following constituent elements:

Joncryl 1535—acrylic polymer emulsion—20%

MD-Both 1981—aluminum paste—5%

Water—75%

In this particular fluid composition, the Joncryl 1535 had a concentration of approximately 37% solids. However, and when diluted in the present fluid composition, the total solids concentration was approximately 7.4%. Additionally, the MD-Both 1981 had a total solids concentration of approximately 65%. When diluted in the fluid composition of the present invention, the total solids concentration was approximately 3.25%. Therefore, the total solids concentration, by volume, in the composition of the present example was approximately 10.65%. The resulting fluid composition was thereafter raised to approximately 130° F., and metal parts having a temperature of approximately 990° F. were subsequently quenched in the bath for a period of approximately 30 seconds. Following examination of the parts, similar results were obtained as set forth in example 1, above.

EXAMPLE 4

A fluid composition in accordance with the teachings of the present invention was made by the general procedure described above This fluid composition had the following constituent elements:

Jonwax 39—polypropylene wax emulsion—14.85%

CDI BS13544—tinting black aqueous dispersion—0.9%

Water—84.15%

In this particular example, the Jonwax 39 had a solids concentration of approximately 40%. When diluted in the present composition, its total solids concentration becomes approximately 5.94%. In the case of the BS13544, its total solids concentration is approximately 45%. When diluted in the fluid composition, noted above, the total concentration represented approximately 0.45%. Therefore, the total solids concentration of the present bath, by volume, is 6.39%. The resulting fluid composition was heated to a temperature of 135° F., thereafter, and the metal parts were quenched in this composition having been previously raised to a temperature of 300° F. Following exposure to the bath for approximately 30 seconds, the objects were removed and thereafter inspected. Similar results were obtained as with Example 1, noted above. This same procedure was repeated for parts which had a temperature of 900° F. Similar results were obtained.

EXAMPLE 5

A composition in accordance with the teachings of the present invention was made by the general procedure described above. This composition had the following constituent elements:

Jonwax 26—polyethylene wax emulsion—22.77%

CDI BS13544—tinting black aqueous dispersion—0.9%

Water—76.23%

In this particular example, the Jonwax 26 had a solids concentration of approximately 26%. When diluted in the present composition, its solids concentration becomes approximately 5.92%. The total solids concentration of the BS13544 represented 0.45%. Therefore, the total solids concentration of the present bath is approximately 6.31%. The resulting fluid composition was heated to a temperature of 135° F. thereafter, and the metal parts were quenched for a period of 35 seconds in this composition having been previously raised to a temperature of 300° F. Following quenching in the bath, the objects were removed and inspected. Similar results were obtained with Example 1, noted above. This procedure was repeated for parts which had a temperature of 900° F. Similar results were obtained.

EXAMPLE 6

A composition in accordance with the teachings of the present invention was made by the general procedure described above. This composition had the following constituent elements:

Jonwax 120—polyethylene/paraffin wax emulsion—17.36%

CDI BS13544—tinting black aqueous dispersion—0.99%

Water—81.68%

In this particular example, the Jonwax 120 had a solids concentration of approximately 34%. When diluted in the present composition, its solids concentration becomes approximately 5.9%. In the case of the BS13544, its total solids concentration is approximately 45%. When diluted in the fluid composition, noted above, its total solids concentration becomes approximately 0.45%. Therefore, the total solids concentration of the present bath, by volume is approximately 6.34%. The resulting fluid composition was heated to a temperature of 135° F., and the metal parts were quenched for a period of 35 seconds in this composition having been previously raised to a temperature of 300° F. Following exposure to the bath for the predetermined period, the objects were removed and inspected. Similar results were obtained as with Example 1, noted above. A subsequent test conducted with parts that had been raised to a temperature of 900° F. yielded similar results.

EXAMPLE 7

A composition in accordance with the teachings of the present invention was made by the general procedure, noted above. This fluid composition had the following constituent elements:

Jonwax 22—microcrystalline wax emulsion—17.32%

CDI BS13544—tinting black aqueous dispersion—0.99%

Water—81.68%

In this particular example, the Jonwax 22 had a solids concentration of approximately 34%. When diluted in the present composition, the solids concentration becomes approximately 5.8%. In the case of the BS13544, its total solids concentration is approximately 45%. When diluted in the fluid composition, noted above, the total solids concentration becomes approximately 0.45%. Therefore, the total solids concentration of the present bath, by volume, is approximately 6.33%. The resulting fluid composition was heated to a temperature of 135° F., and the metal parts were quenched in this composition having been previously raised to a temperature of 300° F. Following exposure to the bath, for approximately 35 seconds, the objects were removed and thereafter inspected. Similar results were obtained as with Example 1, noted above. A subsequent test conducted with the parts which had been raised to a temperature of 900° F. for 40 seconds yielded similar results.

EXAMPLE 8

A composition in accordance with the teachings of the present invention was made by the general procedure described above. This composition had the following constituent elements:

Cymel 303—hexamethoxymethyl melamine which is supplied in liquid form at a concentration of greater than 98% nonvolatiles. Cymel 303 is the trademark of the American Cyanamid Company—6.18%

CDI BS13544—tinting black aqueous dispersion—0.99%

Water—92.8%

In this particular example, the Cymel 303 had a solids concentration of approximately 98%. When diluted in the present composition, the solids concentration becomes approximately 6.05%. In the case of the BS13544, its total solids concentration is approximately 45%. When diluted in the fluid composition, noted above, the total solids concentration becomes approximately 0.45%. Therefore, the total solids concentration of the present bath, by volume, is approximately 6.495%. The resulting fluid composition was heated to a temperature of 135° F. The metal parts were thereafter quenched, in this composition, having been previously raised to a temperature of approximately 300° F. Following exposure to the bath for approximately 30 seconds, the objects were removed and thereafter inspected. Similar results were obtained as with Example 1, noted above. This test was repeated with objects having a temperature of 900° F. The coating appeared to be less than satisfactory in relative comparison to the earlier coatings.

EXAMPLE 9

A composition in accordance with the teachings of the present invention was made by the general procedure described above. This composition had the following constituent elements:

Cymel 303—hexamethoxymethyl melamine which is supplied in liquid form at a concentration of greater than 98% nonvolatiles. Cymel 303 is a trademark of the American Cyanamid Company—6.17%

"Cycat"—toluene sulfonic acid in isopropanol—0.148%

CDI BS13544—tinting black aqueous dispersion—0.98%

Water—92.68%

In this particular example, the Cymel 303 had a total solids concentration of greater than 98%. When diluted in the present composition, the solids concentration becomes approximately 6.04%. In the case of the "Cycat" which is a toluene sulfonic acid in isopropanol, and which is marketed under the same trade name by the American Cyanamid Company, its total solids concentration following dilution in the fluid composition, noted above, was approximately 0.0429%. In the case of the BS13544, its total solids concentration is approximately 45%. When diluted in the fluid composition, noted above, the total solids concentration becomes approximately 0.45%. Therefore, the total solids concentration of the present bath is approximately 6.52%. The resulting fluid composition was heated to a temperature of approximately 130° F., and thereafter, metal parts which had been previously heated to a temperature of approximately 900° were quenched in same. Following exposure to the bath for approximately 35 seconds the objects were removed and inspected. While the objects were uniformly coated, some areas of the coat appeared gummy, and it was observed that "Cymel 303" did not disperse as well as could be expected with the other substances earlier disclosed.

EXAMPLE 10

A composition in accordance with the teachings of the present invention was made by the general procedure described above. This composition had the following constituent elements:

Joncryl 540—rheology controlled emulsion—9.3%

Cymel 303—hexamethoxymethyl melamine supplied in liquid form at greater than 98% nonvolatiles—1.48%

CDI BS13544—tinting black aqueous dispersion—0.98%

Water—87.8%

In this particular example, the Joncryl 540 had a total solids concentration of approximately 44%. When diluted in the present composition, the total solids concentration becomes approximately 4.09%. In the case of the Cymel 303, its total solids concentration is greater than 98%. When diluted in the fluid composition, noted above, the solids concentration becomes approximately 1.30%. In the case of the BS13544, its total solids concentration is approximately 45%. When diluted in the fluid composition, noted above, its total solids concentration becomes approximately 0.45%. Therefore, the total solids concentration of the present bath, by volume, is approximately 4.84%. The resulting fluid composition was heated to a temperature of 130° F. and the metal parts were thereafter quenched in this composition having been previously raised to a temperature of approximately 900° F. Following exposure to the bath for approximately 35 seconds, the objects were thereafter inspected. Similar results were obtained as with Example 1, noted above. This same test was repeated with objects which had been raised to a temperature of 300° F. Similar results were obtained.

EXAMPLE 11

The composition in accordance with the teachings of the present invention was made by the general procedure described above. This composition had the following constituent elements:

Spensol L-52—aliphatic aqueous thermoplastic urethane—19.8%

CDI BS13544—tinting black aqueous dispersion—0.99%

Water—79.20%

In this particular example, the Spensol L-52 had a total solids concentration of approximately 30%. When diluted in the present composition, the total solids concentration becomes approximately 5.94%. In the case of the BS13544, its total solids concentration is approximately 45%. When diluted in the fluid composition, noted above, the total solids concentration becomes approximately 0.45%. Therefore, the total solids concentration of the present bath, by volume, is approximately 6.33%. The resulting fluid composition was heated to a temperature of approximately 130° F. and the metal parts were quenched in this composition having been previously raised to a temperature of 300° F. Following quenching in the bath for approximately 35 seconds, the objects were removed and inspected. The objects appeared to have a smooth, dull appearing, black coating applied to same. When the same formulation, noted above, was then utilized with metal parts which had been raised to a temperature of approximately 900° F., and which were subsequently quenched for a period of 90 seconds, a thick, crystalline appearing coating was deposited. However, the coating was otherwise acceptable in view of the results of Example 1, noted above.

EXAMPLE 12

A composition in accordance with the teachings of the present invention was made by the general procedure, noted above. This fluid composition had the following constituent elements:

Joncryl 617—acrylic polymer emulsion—13.11%

CDI BS13544—tinting black aqueous dispersion—0.99%

Water—85.89%

In this particular example, the Joncryl 617 had a solids concentration of approximately 45.5%. When diluted in the present composition, the solids concentration becomes approximately 5.89%. In the case of the BS13544, the total solids concentration is approximately 45%. When diluted in the fluid composition, noted above, the total solids concentration becomes approximately 0.45%. Therefore, the total solids concentration of the present bath, by volume, is approximately 6.335%. The resulting fluid composition was then heated to a temperature of approximately 130° F. and metal parts, having been raised to a temperature of approximately 300° F. were quenched in same for a period of approximately 35 seconds. Following exposure to the bath for the predetermined period of time, the objects were removed and inspected. The individual parts were coated with a smooth, semi-dull appearing, black coating. When the same formulation was utilized with parts which had been raised to a temperature of approximately 900° F. and which were quenched for a period of 60 seconds, a thicker, substantially crystalline appearing coating was applied to same. This coating was otherwise acceptable for the purpose which has been described herein.

EXAMPLE 13

A composition in accordance with the teachings of the present invention was made by the general procedure noted above. This fluid composition had the following constituent elements:

Joncryl 617—acrylic polymer emulsion—11.8%

XL 29SE—carbodiimide, (XL29SE is a trademark of the Union Carbide Company)—1.18%

CDI BS13544—tinting black aqueous dispersion—0.99%

Water—85.93%

In this particular example, the Joncryl 617 had a solids concentration as set forth in Example 12, noted above. When diluted in the present composition, the solids concentration becomes approximately 5.31%. In the case of the XL29SE its total solids concentration is approximately 50%. When diluted in the bath its total solids concentration becomes approximately 0.25%. In the case of the BS13544, the total solids concentration in the present formulation is identical to Example 12, above, that is 0.45%. Therefore, the total solids concentration of the present bath, by volume, is approximately 5.75%. The resulting fluid composition was thereafter heated to a temperature of approximately 135° F. and metal parts having been previously raised to a temperature of approximately 300° F. were quenched in same for a period of approximately 35 seconds. The resulting parts were removed and inspected and were found to have a smooth, black, thin coating which was acceptable. Further, this same composition was employed on parts which were previously raised to a temperature of 900° F. and which were quenched for a period of approximately 60 seconds. A medium thick, substantially crystalline appearing coating was deposited on same. Additionally, some gummy appearing surfaces were evident. Otherwise, the coating was acceptable.

EXAMPLE 14

The composition in accordance with the teachings of the present invention was made by the general procedure noted above. This fluid composition had the following constituent elements:

Cargill 7478—phenolic modified alkyd—7.9%

Cycat—toluene sulfonic acid in isopropanol—0.37%

Butanol—0.396%

Butyl Cellosolve—0.792%

Cobalt Zinc—0.079%

CDI BS13544—tinting black aqueous dispersion—0.99%

Water—89.47%

In this particular example, Cargill 7478 has a solids concentration of approximately 75%. When diluted in the present composition, the solids concentration becomes approximately 5.925%. In the case of the BS13544, the total solids concentration is approximately 45%, as noted above. When diluted in the fluid composition, noted above, the total solids concentration becomes approximately 0.45%. Therefore, the total solids concentration of the present bath including all the solids of the remaining elements is approximately 6.4%. The resulting fluid composition was thereafter heated to a temperature of approximately 130° F. and the metal parts which had been subsequently heated to a temperature of 900° F. were quenched in the solution for a period of approximately 35 seconds. Following exposure to the bath, the objects were removed and thereafter inspected. Similar results were attained as with Example 1, noted above.

EXAMPLE 15

The composition in accordance with the teachings of the present invention was made by the general procedure, noted above. This fluid composition had the following constituent elements:

Serfene 2060—polyvinylidene chloride copolymer emulsion—20%

CDI BS13544—tinting black aqueous dispersion—1%

Water—79%

In this particular example, the Serfene 2060 had a solids concentration of approximately 50%. When diluted in the present composition, the solids concentration becomes approximately 10%. Serfene 2060 is manufactured and sold by the Morton International Company of Chicago, Ill. In the case of the BS13544, the total solids concentration in the present formulation is identical to Example 12, above, that is, 0.45%. Therefore, the total solids concentration of the present bath, by volume, is approximately 10.45%. The resulting fluid composition was thereafter heated to a temperature of approximately 135° F. and metal parts having been previously raised to a temperature of approximately 300° F. were quenched in same for a period of approximately 30 seconds. The resultinq parts were removed and inspected and were found to have a smooth, thin, black coating, which was acceptable.

EXAMPLE 16

A composition in accordance with the teachings of the present invention was made by the general procedure, noted above. This fluid composition had the following constituent elements:

ACqua 220—aqueous dispersion of a zinc salt of an ethylene acrylic copolymer—20%

CDI BS13544—tinting black aqueous dispersion—1%

Water—79%

In this particular example, the ACqua 220 is an aqueous dispersion of a zinc salt of an ethylene acrylic copolymer which is manufactured and marketed by Allied Signal, Inc. The resulting fluid composition was thereafter heated to a temperature of approximately 80° F. and metal parts which had been subsequently heated to a temperature of 800° F. were quenched in the bath for approximately 30 seconds. Following exposure to the bath, the objects were removed and thereafter inspected. Similar results were attained as with Example 1, noted above.

EXAMPLE 17

The composition in accordance with the teachings of the present invention was made by the general procedure, noted above. This fluid composition had the following constituent elements.

Joncryl 91—acrylic colloidal solution—20%
Joncryl 646—acrylic colloidal emulsion—10%
CDI BS13544—tinting black aqueous dispersion—1%
Water—69%

In this particular example, the Joncryl 91 had a total solids concentration of approximately 25.5%. When diluted in the present composition, the total solids concentration becomes approximately 5.1%. In the case of the BS13544, its total solids concentration is approximately 45%. When diluted in the fluid composition, noted above, the total solids concentration becomes approximately 0.45%. In the case of the Joncryl 646, its total solids concentration is approximately 39.5%. When diluted in the composition of the present invention, the total solids concentration becomes approximately 3.95%. Therefore, the total solids concentration of the present bath, by volume, is approximately 9.5%. The resulting fluid composition was heated to a temperature of approximately 130° F. and the metal parts were quenched in this composition having been previously raised to a temperature of approximately 300° F. Following quenching in the bath for approximately 30 seconds, the objects were removed and inspected. The objects appeared to have a smooth, shiny, black coating applied to same. When the same formulation, noted above, was utilized with metal parts which have been raised to a temperature of approximately 900° F. and were quenched for the same period of time, the identical results were obtained.

EXAMPLE 18

A fluid composition in accordance with the teachings of the present invention was made by the general procedure described above. This fluid composition had the following constituent elements:

Joncryl 91—acrylic colloidal solution—20%
Halox SZP391—calcium strontium zinc phosphosilicate pigment—2%
CDI BS13544—tinting black aqueous dispersion—1%
Water—77%

In this particular example, the Joncryl 91 had a total solids concentration of approximately 25.5% When diluted in the present composition, its solids concentration becomes approximately 5.10%.

In the case of the Halox SZP391, which is an inhibitive pigment marketed by Halox Pigments of Hammond Ind. and which is supplied as an additive to improve the corrosion resistance of the final coating, the Halox pigment is 100% solids, so its total solids concentration in the fluid composition noted above is 2%. In the case of the BS13544, its total solids concentration is approximately 45%. When diluted in the fluid composition, noted above, the total concentration represented approximately 0.45%. Therefore, the total solids concentration of the present bath, by volume, is approximately 7.55%. The resulting fluid composition was heated to a temperature of 135° F., thereafter, and the metal parts were quenched in this composition having been previously raised to a temperature of 135° F. Following exposure to the bath for approximately 45 seconds, the objects were removed and thereafter inspected. Similar results were obtained as with Example 1, noted above. This same procedure was repeated for parts which had a temperature of 300° F. Similar results were obtained.

EXAMPLE 19

A fluid composition in accordance with the teachings of the present invention was made by the general procedure described above. This fluid composition had the following constituent elements:

Joncryl 61—10%
CDI-BS11932—$TiO_2$ white pigmented aqueous dispersion—5%
SCN Chemical Corp.—Flexiverse H57—5%
Water—80%

In this particular example, the Joncryl 61 had a solids concentration of approximately 35%. When diluted in the present composition, its solids concentration becomes approximately 3.5%. In the case of the CDI-BSI11932, the $TiO_2$ pigment concentration is approximately 64% so that when diluted in the bath the white pigment concentration becomes approximately 3.2%. The total solids concentration of the Flexiverse H57 pigment (red) dispersed in water is approximately 40%. When diluted in the bath, the total solids concentration becomes approximately 2.0%. Therefore, the total solids concentration of the present bath was approximately 8.7%. The resulting fluid composition was heated to a temperature of 120° F., thereafter, and the metal parts were quenched in this composition having been previously raised to a temperature of 900° F. Following exposure to the bath for approximately 30 seconds, the objects were removed and thereafter inspected. A uniform pink colored coating was obtained.

Therefore, it will be seen that the method and composition of the present invention provides a fully dependable and practical means by which an object of interest such as a metal part which may be made of steel, aluminum, or other alloys or the like, can be coated economically and conveniently and which further avoids the detriments associated with the prior art practices which include, among others, the use of environmentally detrimental chemicals, time consuming processes, and further requires the pretreatment of the parts, such as by the use of degreasing fluids, solvents, and other materials which increase the complexity and slow the speed with which a particular manufacturing process may be completed. In addition to the foregoing, the improved composition and method of the present invention shows surprising and unusually desirable manufacturing advantages when compared with the prior art.

It will be apparent to those skilled in the art that the foregoing examples have been made for the purposes of illustration and that variations may be made in proportions, procedures, and material without departing from the scope of the present invention. Therefore, it is intended that this invention not be limited except by the claims which follow.

Having described our invention, what we claim as new and desire to secure by letters patent of the United States is:

1. A method of coating an object of interest comprising:

forming a bath by admixing about 5 parts to about 90 parts, by volume, of a polymeric solution, emulsion or dispersion with about 0.5 parts to about 9 parts, by volume, of a compatible dispersion, and about 10 parts to about 95 parts water;

elevating the temperature of the admixture from about 80° F. to about 160° F.;

elevating the temperature of the object of interest from about 220° F. to about 1,700° F.; and quenching the object of interest in the bath for a predetermined period of time thereby substantially uniformly coating the admixture on the surface of the object of interest.

* * * * *